Nov. 15, 1966  A. IOPPOLO  3,284,836
VEHICLE DUST COLLECTOR AND VENTILATOR
Filed Dec. 18, 1964
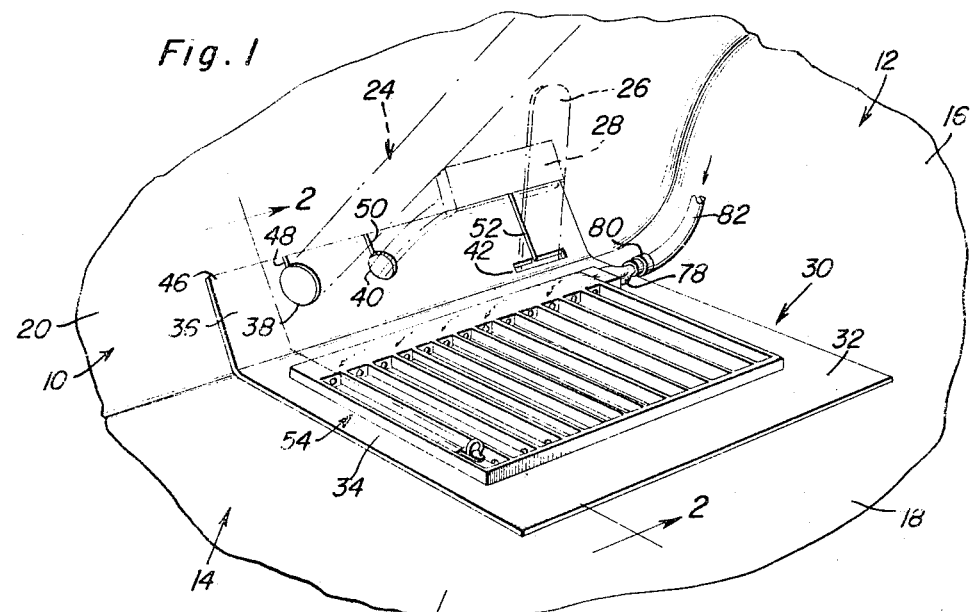
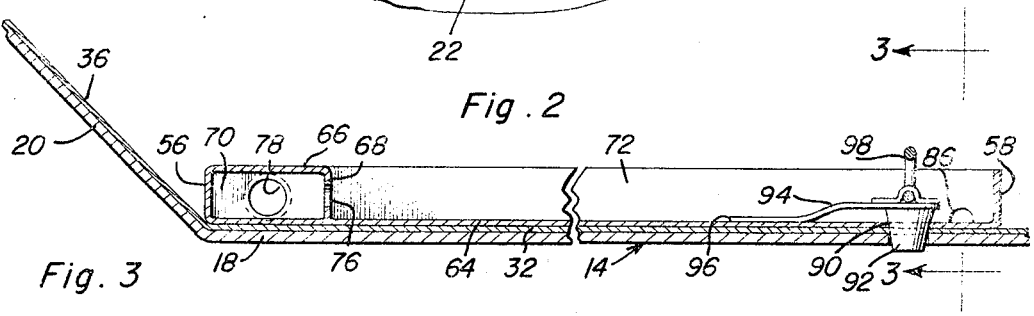
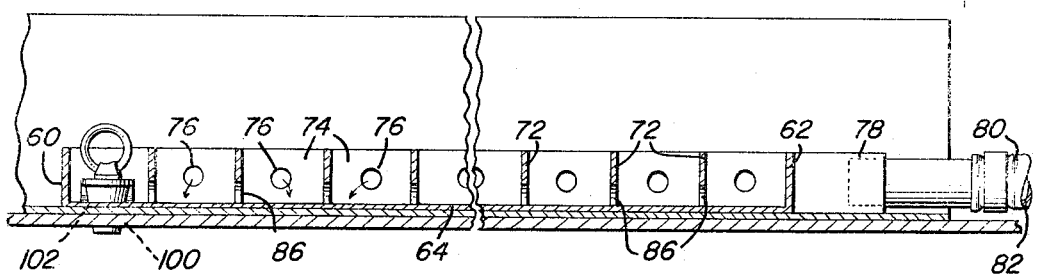
Anthony Ioppolo
INVENTOR.

United States Patent Office 3,284,836
Patented Nov. 15, 1966

3,284,836
VEHICLE DUST COLLECTOR AND VENTILATOR
Anthony Ioppolo, 7675 St. John St., Utica, Mich.
Filed Dec. 18, 1964, Ser. No. 419,388
3 Claims. (Cl. 15—313)

This invention relates to a novel and useful dirt and/or dust collector and ventilator and more specifically to an open top tray-like receptacle adapted to be supported from the floor of the driver's compartment of a vehicle in a position to act as a foot rest for the driver of the vehicle. The dirt and dust collector of the instant invention includes means defining a plurality of upstanding scraping blades which are adapted to scrape mud and dirt from the sole of the shoes of the driver of the vehicle and in addition also includes means for heating the chambers formed between adjacent upstanding partitions or blades whereby snow and/or ice may be melted from the shoes of the driver of the vehicle. In addition, the heating means is also useful in drying shoes of a person driving the vehicle if the driver's shoes are wet from walking in the rain or on wet streets and sidewalks.

Although the vehicle dust collector and ventilator of the instant invention is illustrated and described hereinafter as including means for ducting heated air to the chambers defined between the upstanding partitions or scraping blades, it is to be noted that other means of heating the chambers may be provided such as by hot water or electrical heating means disposed in good heat transfer relationship with at least portions of the dust collector defining the chambers.

The dust collector of the instant invention is constructed in a manner whereby it may be readily removed from the associated vehicle and emptied of dirt and cleaned as desired. In addition, it also includes means by which it may be stationarily positioned in a vehicle of the type including operating pedals which extends through or are supported from at least a portion of the floor of the driver's vehicle whereby the dust collector will not shift in position relative to the portion of the floor from which it is supported.

A main object of this invention is to provide an apparatus designed to be supported on the floor of the driver's compartment of a vehicle and including means defining an open top tray-like receptacle and means for scraping loose dirt and/or mud and snow or ice from the shoes of the driver of the vehicle.

Another object of this invention is to provide a vehicle dust collector and ventilator in accordance with the preceding object and including a plurality of upstanding blades or partitions for engagement with and to scrape mud and/or dirt from the bottom of the shoes of the driver of the vehicle and positioned relative to each other so as to define upwardly opening chambers therebetween extending from one end of the receptacle to the other.

Still another object of this invention is to provide means for communicating the lower portions of the chambers of the dust collector of the instant invention at one set of corresponding ends of the chambers and means for draining fluids from at least one of the chambers.

Yet another object of this invention is to provide closure means removably engaged with and closing the liquid outlet means of the vehicle dust collector.

Another object of this invention is to provide a vehicle dust collector in accordance with the preceding objects and provided with means adapted to discharge heated air into one set of corresponding ends of the chambers.

A final object of this invention to be specifically enumerated herein is to provide a vehicle dust collector and ventilator in accordance with the preceding objects which will conform to conventional forms of manufacture, be of simple construction and easy to install so as to provide a device which will be economically feasible, long lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of the interior of a conventional form of motor vehicle shown with the vehicle dust collector and ventilator of the instant invention operatively supported from the floor of the driver's compartment of the vehicle;

FIGURE 2 is an enlarged fragmentary vertical sectional view taken substantially upon the plane indicated by the section line 2—2 of FIGURE 1; and FIGURE 3 is an enlarged fragmentary vertical sectional view taken substantially upon the plane indicated by the section line 3—3 of FIGURE 2.

Referring now more specifically to the drawings, the numeral 10 generally designates a conventional form of motor vehicle including a driver's compartment generally referred to by the reference numeral 12 including a floor assembly generally referred to by the reference numeral 14. The floor assembly 14 includes the usual longitudinally extending and center hump 16 which defines a downwardly opening tunnel (not shown) for accommodating the transmission (not shown) of the vehicle. The floor assembly or construction 14 also includes a generally horizontally disposed portion 18 which terminates at its forward end in a forwardly and upwardly inclined portion 20. The generally horizontally disposed portion 18 usually is inclined downwardly and rearwardly and downwardly and outwardly so that the lowest portion thereof is at the corner thereof designated by the reference numeral 22.

As can best be seen in FIGURE 1 of the drawings, the motor vehicle 10 includes a conventional steering wheel column 24, an accelerator pedal 26, and a brake pedal 28. The steering column 24 and the brake pedal 28 extended downwardly through the forwardly and upwardly inclined portion or section 20 of the floor assembly 14 and the accelerator pedal 26 is hingedly supported from the forwardly and upwardly inclined section 20.

The vehicle dust collector and ventillator of the instant invention is generally referred to by the reference numeral 30 and includes a generally panel-like base 32 including a main portion 34 and a forward portion 36. At least the forward portion 36 is provided with openings 38, 40 and 42 communicated with the forward edge 46 of the forward portion 36 by means of slots 48, 50 and 52 respectively. In addition, at least the forward portion 36 is constructed of flexible material in order that it may be fitted around the steering column 24, the brake pedal 28 and the base of the accelerator pedal 26 in a conventional manner.

The main section 34 of the base 32 is also being constructed of flexible material but it is to be understood that it may further be constructed of rigid material if desired.

The vehicle dust collector and ventilator 30 includes an open top receptacle generally referred to by the reference numeral 54 including front and rear walls 56 and 58 and opposite side walls 60 and 62 which are interconnected by means of a bottom wall 64. In addition, a partial top wall 66 secured between the forward ends of the opposite side walls 60 and 62 and to the upper edge portion of the front wall 56 terminates at its rear end in a downturned transverse wall 68 which also extends between the opposite side walls 60 and 62. The area defined between the front wall 56 and the partition 68 defines a header chamber 70 and it may be seen that a plurality of partitions 72 extend between the partition 68 and the rear wall 58 and define upwardly opening chambers 74 therebetween into which the header chamber 70 opens by means of the plurality of outlet openings 76 formed in the partition 68.

The header chamber 70 includes an inlet neck 78 which projects outwardly from the side wall 62 and to which the outlet end 80 of a warm air conduit 82 is connected for discharging heated air into the header chamber 70 and thus into the forward ends of the chambers 74.

The inlet end of the pipe or conduit 82 is adapted to be communicated with any suitable source of heated air under pressure such as a vehicle heater or defroster and it may be seen from FIGURES 2 and 3 of the drawings that the partitions 72 each have an opening 86 formed therein adjacent the rear wall 58 and communicated with the bottom or bottom wall 64 whereby liquids falling into the chambers 74 may pass from the rear ends of the various chambers 74 into the rear end of the chambers 74 adjacent the side walls 60.

The portion of the bottom 64 disposed in the rear end of the chamber 74 adjacent the side wall 60 has an outlet opening 90 formed therein and a removable plug 92 is seated in and closes the opening 90 and is held in the closed position by means of a resilient strap 94 to one end of which the plug 92 is secured, the other end of the strap 94 being secured to a portion of the bottom 64 disposed forwardly of the opening 90 in any convenient manner as at 96. The plug 92 has a lifting ring 98 secured thereto which may be lifted in order to extract the plug 92 from the opening 90.

From FIGURES 2 and 3 of the drawings it may also be seen that the horizontal section 18 of the floor assembly 14 is also provided with an opening 100 and further that the bottom 64 is provided with an opening 102, the openings 100 and 102 each being registered with the opening 90.

It will be noted that the opening 90 is larger than the opening 102 and that the opening 102 is larger than the opening 100. Further, it may be seen that the plug 92 is tapered and that when the plug 92 is seated in the opening 90 it is also seated in the openings 100 and 102.

The vehicle dust collector and ventilator 30 may be readily installed in the motor vehicle 10 in the manner which is believed to be obvious and each time the driver of the vehicle 10 enters the driver's compartment he may remove loose mud and dirt from his shoes by moving the soles of the shoes transversely of the partitions 72. In addition, should the driver of the vehicle 10 enter the driver's compartment with snow on his shoes, the heat from the header chamber 70 discharged into the chambers 74 will cause the snow to be melted from the shoes of the driver and inasmuch as the horizontal portion 18 of the floor assembly 14 is inclined rearwardly and outwardly toward the corner 22 the water from the melted snow falling into the chamber 74 will flow rearwardly through the latter and thereafter laterally into the chamber 74 adjacent the side wall 60. When it is desired to empty melted snow from the dust collector and ventilator 30, it is merely necessary for the driver of the vehicle to lift the ring 98 so as to allow the water collected in the corresponding chamber 74 to drain outwardly through the openings 90, 100 and 102.

Should it be desired to heat the receptacle 54 by means other than warm air, the partition 72 could be made in the form of finned tubes and operatively communicated with the hot water engine cooling system of the vehicle 10. Still further, heated water from the engine of the vehicle 10 could be directed to a false bottom below the bottom 64 and if the vehicle 10 was not provided a water cooled engine, the receptacle 54 could be suitably heated by electrical resistance heating means disposed in good heat transfer relation with at least the bottom 64 of the receptacle 54.

In addition, the receptacle 54 may be constructed of or coated with vinyl to insure no sharp edges are present to cut through rubber shoes and the like. Further, the receptacle 54 may also be emptied by removing the conduit 82 therefrom and the receptacle 54 from the vehicle 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vehicle dust collector and ventilator comprising an open top tray-like receptacle including a plurality of upstanding peripheral side walls interconnected by means of a bottom wall, said receptacle including upstanding partitions secured to said bottom wall, extending transversely thereof, and defining elongated chambers between adjacent partitions, said receptacle including a liquid opening in said bottom wall opening into one end of the chamber at one end of said receptacle and adjacent one side of the latter, the ends of said partitions adjacent said one end of said receptacle having openings in the lower portions thereof communicating the corresponding ends of adjacent chambers, said receptacle including a transversely extending elongated hot air header at the other end thereof, said header including hot air outlets opening into and lengthwise of the adjacent ends of said compartments.

2. The combination of claim 1 wherein said hot air header includes an inlet opening adjacent said other end of said receptacle opening outwardly of the other side thereof.

3. The combination of claim 1 including a wedge-type plug removably downwardly inserted into said outlet opening.

References Cited by the Examiner

UNITED STATES PATENTS

| | | | |
|---|---|---|---|
| 1,774,448 | 8/1930 | McKnight | 98—2 |
| 3,082,032 | 3/1963 | Stata | 296—1 |
| 3,149,875 | 9/1964 | Stata | 296—1 |

ROBERT W. MICHELL, *Primary Examiner.*